United States Patent [19]

Baylocq

[11] Patent Number: 5,822,515
[45] Date of Patent: Oct. 13, 1998

[54] CORRECTION OF UNCOMMANDED MODE CHANGES IN A SPACECRAFT SUBSYSTEM

[75] Inventor: Michel B. Baylocq, Menlo Park, Calif.

[73] Assignee: Space Systems/Loral, Inc., Palo Alto, Calif.

[21] Appl. No.: 797,878

[22] Filed: Feb. 10, 1997

[51] Int. Cl.$^6$ .......................... H04B 7/185; G06F 11/00; G06F 11/14; B64G 1/24
[52] U.S. Cl. ................................ 395/185.09; 395/185.08; 342/354; 342/355; 244/164; 701/3; 701/4; 701/13
[58] Field of Search .................. 395/185.08, 185.09; 371/61, 62, 69.1; 342/354, 355; 244/164, 165, 166, 167, 168, 169, 170, 171; 701/3, 4, 5, 6, 7, 8, 9, 10, 11, 12, 13

[56] References Cited

U.S. PATENT DOCUMENTS

| 5,062,592 | 11/1991 | Kishimoto | 244/164 |
| 5,556,058 | 9/1996 | Bender | 244/171 |
| 5,563,794 | 10/1996 | Cosner et al. | 701/13 |
| 5,587,714 | 12/1996 | Chu et al. | 342/354 |

Primary Examiner—Robert W. Beausoliel, Jr.
Assistant Examiner—P. Vales
Attorney, Agent, or Firm—Perman & Green, LLP

[57] ABSTRACT

In a spacecraft having devices which are operative in plural modes, particularly an earth sensor operative in a north hemispherical inhibit mode, a south hemispherical inhibit mode, and a normal mode, a watchdog circuit* is employed to detect the presence of a mode command issued to the device. The command may be issued by a station on the earth, and communicated via a telemetry link to the spacecraft. The watchdog circuit may be part of a central processing unit (CPU) with a computer on board the spacecraft, the computer serving to perform various data processing operations for the mission of the spacecraft. The watchdog circuit stores the mode command and then repeats the command during a succession of repetitions. Thereby, in the event that the device, particularly the earth sensor, is momentarily disabled by an electrostatic discharge (ESD) event, wherein digital control circuitry of the earth sensor may shift the sensor to a different mode of operation, the next repetition of the mode command from the watchdog circuit reinstates the desired mode of operation. The watchdog circuit and the CPU are radiation hardened and may be enclosed by a Faraday shield to render them substantially impervious to the radiation.

7 Claims, 2 Drawing Sheets

CORRECTION OF UNCOMMANDED MODE CHANGES IN A SPACECRAFT SUBSYSTEM

BACKGROUND OF THE INVENTION

This invention relates to control of spacecraft subsystems, and more particularly to control of changes in a mode of operation of a spacecraft subsystem, such as one of plural modes of operation of an earth sensor, to counteract an uncommanded change in mode of operation.

A spacecraft carries various devices which are operated in a plurality of modes. Examples of such devices are sensing devices, individual ones of which may be operated in various scanning modes.

With respect to the various devices which may be carried by a spacecraft, there is particular interest herein in an earth sensor. The earth sensor employs a scanning mirror which scans around the pitch axis of the spacecraft. In the usual construction of the earth sensor, two heat sensitive detectors are employed for sensing the transition from the relatively low temperature of outer space to the relatively high temperature from radiation received from the earth. The two detectors are spaced apart so as to produce, in combination with the scanning movement of the mirror, two separate scan paths for which radiation of the earth is reflected to one or both of the detectors. The transitions from cold to hot temperature designate a perimetric portion of the earth as measured in degrees of angle. By centering the scan pattern upon the earth, such that the center of the scan pattern is equidistant between the transition points, there is determined the location of the earth in angle relative to a local coordinate system of the spacecraft. In the case of a spacecraft operating as a satellite about the earth in a station keeping position, the diameter of the earth, as measured by viewing angle from the satellite is 18.1°. The two scan lines are spaced apart by 12°, and each of the scan lines extends 25° in azimuth. The viewing angle for radiation received at each detector is 1.5°. It is understood that the foregoing measures are given by way of example, and may be varied for different earth sensors.

A situation of concern arises during an equinox wherein the sun, as viewed from the spacecraft, is disposed in the orbital plane. As a result, upon passage of the satellite in its path around the earth, the sun comes into view of the sensor. The sun subtends an angle of 0.5° and, due to the high intensity of its radiation, has an effective diameter, in terms of generating a response by one of the detectors, which is in the range, typically, of 3°–4°. Since the diameter of the earth, as viewed in angle, is greater than the spacing between the scan lines, the earth is viewed by both detectors simultaneously. However, since the effective diameter of the sun, in terms of viewing angle from the spacecraft, is less than the spacing between the two scan lines, the sun can be viewed effectively by only one of the two detectors. The effect of the sun is to give an incorrect reading to the earth sensor because the detectors are unable to distinguish between thermal radiation emanating from the sun and thermal radiation emanating from the earth. Thus, in essence, the transitions between cold and hot which would be observed by a detector viewing the sun cannot be distinguished from the desired viewing of the perimetric regions of the earth. Therefore, as a practical matter, the earth sensor has been disabled by the viewing of the sun.

To compensate for such a situation, it is common practice for a ground station, by use of a telemetry link with the spacecraft, to transmit a command signal to the spacecraft directing the earth sensor to employ only one of the detectors, and to inhibit a scanning by the other of the two detectors. Thus, there are three operating modes of the earth sensor, namely, a normal scan employing both detectors, a second mode wherein the north hemisphere scanning of one of the detectors is inhibited, and a third mode wherein the south hemisphere scanning detector is inhibited. Thereby, the earth sensor responds to signals of only one of the detectors, namely, the detector which is able to view the earth without interference from the sun.

An important aspect in the construction of the spacecraft electronics concerns the protection of electronic circuitry from electrostatic discharges from high energy particles in outer space. For example, the central processing unit (CPU) is normally radiation hardened, and may employ an external Faraday shield which may be in the form of a box or cage enclosing the CPU. However, the sensors may be located outside of the Faraday shield, and may be constructed of non-radiation hardened circuitry.

As a result, a problem arises in that the presence of electrostatic discharge (ESD) events may impact upon the earth sensor and so affect its electrical circuitry momentarily such that the digital control circuitry thereof causes the earth sensor to switch from one of its designated modes of operation to another mode of operation which has not been commanded. For example, an earth sensor which is operating in the north scan inhibit mode might switch over to the normal mode or to the south scan inhibit mode, in which case there may be interference from the sun, or possibly from the moon, which would interrupt operation of the earth sensor. The CPU may be unaware of the mode switch and the erroneous signal output from the earth sensor. This would interfere with proper attitude control of the spacecraft.

SUMMARY OF THE INVENTION

The aforementioned problem is overcome and other advantages are provided by use of a watchdog circuit, in accordance with the invention, for monitoring telemetry commands transmitted from an earth station to the spacecraft, the commands designating a mode of operation of a device carried by the spacecraft, such device being, by way of example, an earth sensor. The watchdog circuit may be incorporated within the CPU, or may be constructed as a circuit external to the CPU. The watchdog circuit serves to store the commanded mode of operation. Thereafter, the watchdog circuit is operative to repeat the mode command to the earth sensor via a continuing sequence of repetitions of the mode command. Thereby, in the event that the earth sensor, or other device carried by the spacecraft, is accidentally thrown out of a desired operating mode by an ESD event, shortly thereafter the next repetition of the mode command is received at the earth sensor from the watchdog circuit. The repetition of the watchdog command is operative to reinstate the desired operating mode of the earth sensor, thereby avoiding a prolonged interval of time wherein the earth sensor would be providing erroneous signals to the CPU.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION

Figure 1:
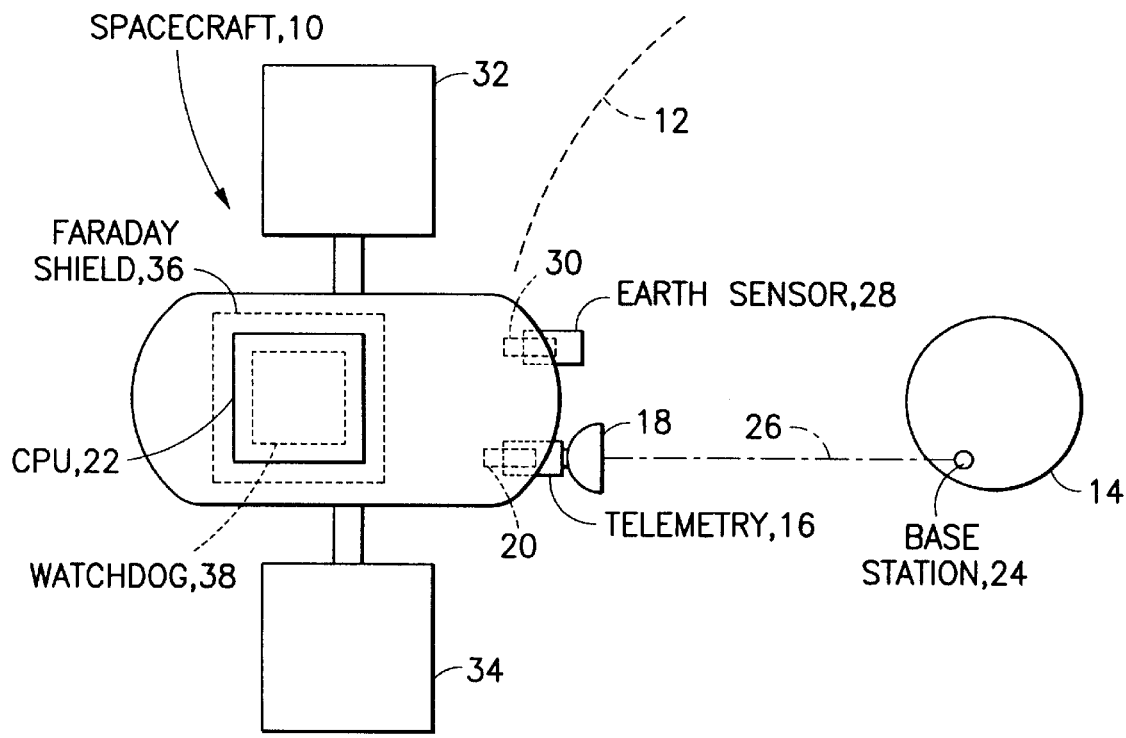
FIG. 1 is a stylized view of a spacecraft encircling the earth.

FIG. 1 shows a spacecraft 10 traveling along a path 12 which encircles the earth 14. The spacecraft 10 carries telemetry equipment 16 including an antenna 18 and communication circuitry 20. A CPU 22 on board the spacecraft 10 provides for data processing, command and control functions for the mission of the spacecraft. The CPU 22 communicates with a base station 24 on the earth 14 via a telemetry link 26 wherein RF (radio frequency) signals are transmitted between the telemetry antenna 18 and the base station 24. The telemetry link 26 enables two-way communication of both data and command signals between the spacecraft 10 and the base station 24. Also carried by the spacecraft 10 is sensing equipment, such as an earth sensor 28. The earth sensor 28 connects with sensing circuitry 30 which provides for control of scanning modes of the earth sensor 28 in response to commands of the CPU 22, the sensing circuitry 30 also providing for extraction of data of the earth sensor 28 for transmittal to the CPU 22. Electric power for operation of the electronic equipment of the spacecraft 10, including the circuitry 20 and 30, is provided by solar panels 32 and 34 extending from the spacecraft 10 for interception of rays of the sun. The CPU 22 is hardened against external radiation from outer space, and is enclosed within a Faraday shield 36 for protection against disruptions in operation which may result otherwise from the radiation. The earth sensor 28 and its circuitry 30 are located externally to the Faraday shield 36.

In accordance with the invention, command signals for selection of a mode of operation of the earth sensor 28 can be obtained from both a distant location, such as the base station 24, and from a local site in the form of a watchdog circuit 38 which provides repetitions of the mode command signals provided by the base station 24. The watchdog circuit 38 is located within the Faraday shield 36. The watchdog circuit 38 may be separate from the CPU 22, or may be incorporated within the CPU 22 by sharing circuitry of the CPU 22.

Figure 2:
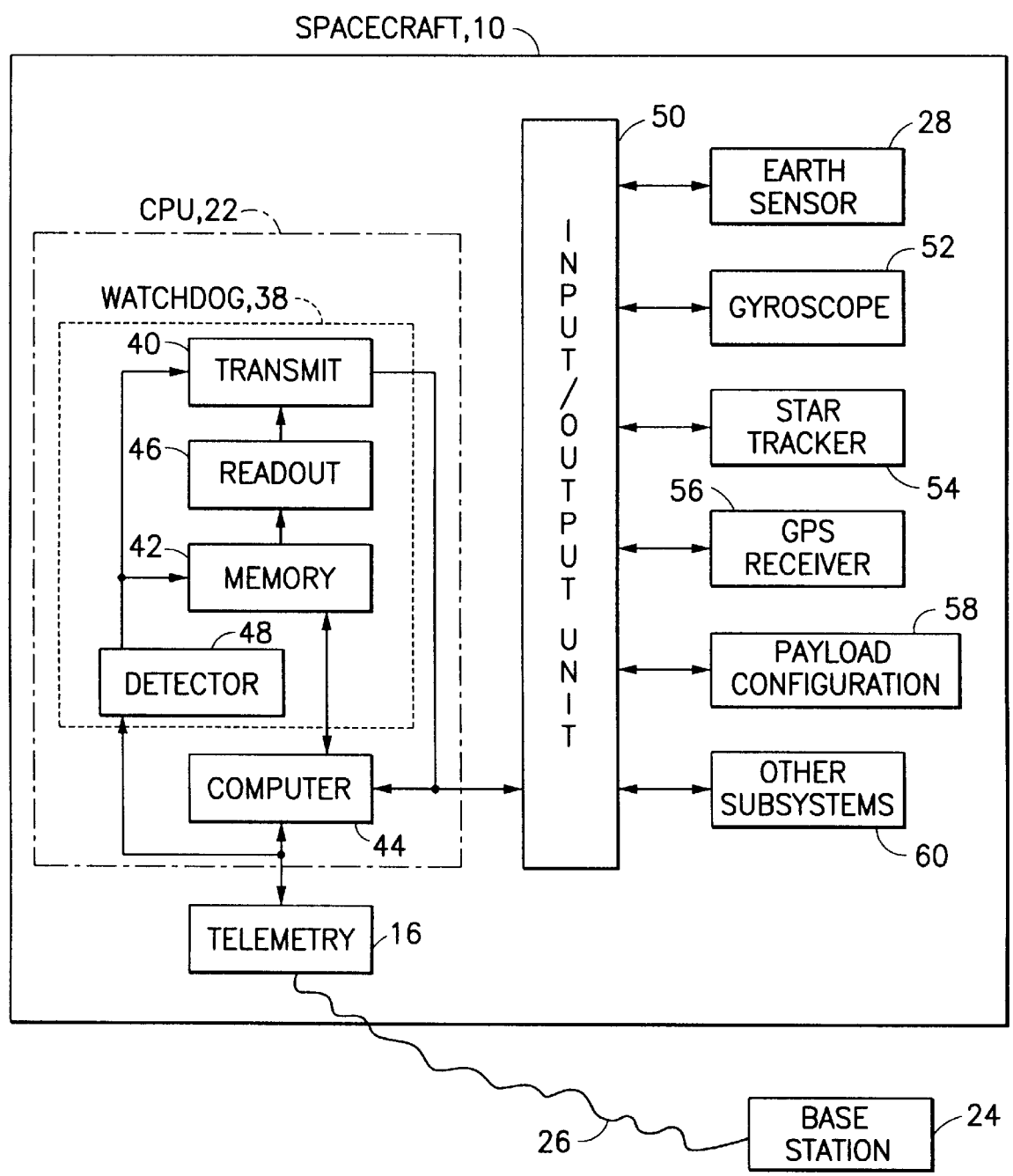
FIG. 2 is a block diagram of circuitry carried by the spacecraft of FIG. 1.

FIG. 2 shows interconnection of the electronic equipments on board the spacecraft 10. The watchdog circuit 38 is included within the CPU 22, and includes a transmitter 40, a memory 42 which is shared with a computer 44 of the CPU 22, a readout unit 46 interconnecting the memory 42 with the transmitter 40, and a detector 48 coupled to the telemetry equipment 16 and connecting also with the memory 42 and the transmitter 40. The computer 44 also connects with the telemetry equipment 16 for receipt of data and command signals from the base station 24, and for transmitting data to the base station 24 in the performance of its functions in carrying out the mission of the spacecraft 10.

The computer 44 connects via an input/output unit 50 with the earth sensor 28, and other equipment carried by the spacecraft 10, the other equipment including, by way of example, a gyroscope 52, a star tracker 54, a GPS (global positioning system) receiver 56, a payload configuration 58, as well as other subsystems indicated at 60.

In the operation of the spacecraft 10, there is a transmission of data and command signals via the telemetry link 26 from the base station 24 to the spacecraft 10. The detector 48 detects the presence of a command signal for the earth sensor 28 among other command signals and data which may be present on the telemetry link 26. Of particular interest herein is the transmission of a mode command signal from the base station 24 to the earth sensor 28. Such a command signal may be detected by the computer 44 and applied by the computer 44 via the input/output unit 50 to the earth sensor 28. Alternatively, in accordance with the invention, the detector 48 applies the mode command signal to the memory 42 for storage therein, and may also apply the mode command signal directly to the transmitter 40 for transmission to the earth sensor 28. Thereafter, the readout unit 46 is operative to read out the mode command signal from the memory 42 and apply the mode command signal at regular intervals to the transmitter 40 for transmission to the earth sensor 28. By the repetitive reading out of the mode command signal, and the repetitive transmission of the mode command signal to the earth sensor 28, the earth sensor 28 is continually commanded to operate in a selected scanning mode. In the event of a disruption of the scanning mode and a possible switching to another scanning mode in response to an ESD disturbance, the next occurrence of the mode command reinstates the selected scanning mode in the earth sensor 28. The reinstatement occurs with sufficient rapidity to ensure that there is no excessive period of time wherein the earth sensor 28 is scanning in an undesired scanning mode.

Figure 3:
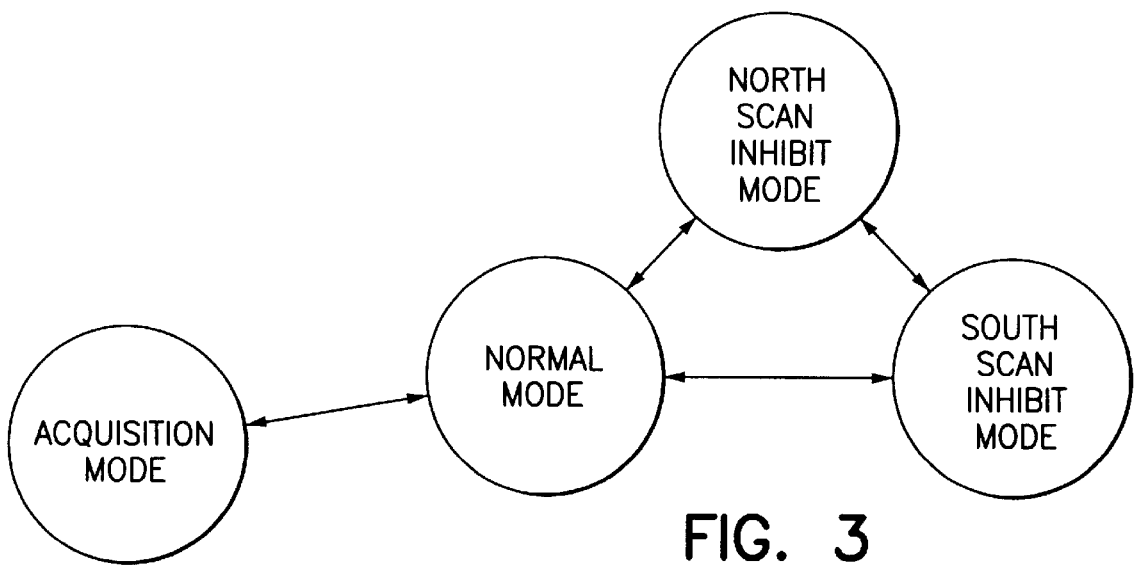
FIG. 3 is a state diagram of the earth sensor showing various operating modes of the earth sensor.

The various scanning modes are indicated in the state diagram of FIG. 3 wherein the earth sensor 28 first undergoes an acquisition mode to acquire the location of the earth, after which the normal scanning mode is employed. In the event that the apparent trajectory of the moon or of the sun, as viewed from the spacecraft 10, comes within the view of the earth sensor, then the base station 24, which has prior knowledge of the relative locations of the moon, the sun, and the spacecraft 10, outputs a command to select either the north scan inhibit mode or the south scan inhibit mode as may be required. Thereby, the spacecraft is able to fulfill its mission in the presence of ESD disturbance of the earth sensor 28. In analogous fashion, the transmitter 40 of the watchdog circuit 38 may be employed to transmit mode commands, via the input/output unit 50, or other operating commands, repetitively to other equipments carried by the spacecraft 10 to ensure their continued operation in the event of an ESD disturbance. In the event that the base station 24 selects another mode of operation, the computer 44 erases the previous command from the memory 42 and allows entry of the new command from the detector 48 into the memory 42 for storage therein.

It is to be understood that the above described embodiment of the invention is illustrative only, and that modifications thereof may occur to those skilled in the art. Accordingly, this invention is not to be regarded as limited to the embodiments disclosed herein, but is to be limited only as defined by the appended claims.

What is claimed is:

1. In a spacecraft having a central processing unit (CPU) and a device, the CPU being hardened against radiation encountered by the spacecraft during a traveling of the spacecraft in space, the device being operative in any one of a plurality of modes, the device being subject to disruption from electrostatic discharge (ESD) of the radiation, the disruption being manifested by a switching from one of said modes of operation to a second of said modes of operation, a system for operating the device comprising:

means for communicating a signal having a mode command to said device;

means coupled to said communicating means for storing said mode command; and means coupled to said storing means for repetitively applying said mode command to said device for reestablishing a desired operating mode in the event of an occurrence of the disruption.

2. A system according to claim 1 wherein said spacecraft has a Faraday shield enclosing said CPU, said device is a sensor disposed outside of said Faraday shield, said communicating means includes telemetry means for transmitting the mode command signal from a location distant from the spacecraft to the spacecraft, and said means for repetitively applying the mode command is located on the spacecraft within said Faraday shield.

3. A system according to claim 2 wherein said device is an earth sensor having a mode of inhibited north hemispherical scanning and a mode of inhibited south hemispherical scanning and a mode of concurrent scanning in both the north and the south hemispherical scannings, and said location distant from the spacecraft is on the earth.

4. A system according to claim 3 wherein said means for repetitively applying the mode command includes a watchdog circuit, said watchdog circuit having means for detecting a presence of the mode command signal among a plurality of other signals transmitted by said telemetry means.

5. A method for correcting a selection of operating mode of a device for which mode selection has been interrupted by a disruption, comprising the steps of:

determining by a monitor located relatively close to the device that an operating mode for the device has been selected by command from a source of command located relatively distant from the device; and employing the monitor to reissue repetitively the command to the device for continual operation of the device within a selected mode of operation over an interval of time including a possible occurrence of the disruption.

6. A method according to claim 1 wherein said device is on board a spacecraft, said source of command is located remote from the spacecraft, said monitor comprises electrical detection circuitry, and said determining step is performed electrically by detection of a presence of a mode command.

7. A method according to claim 6 wherein said device includes electrical circuitry for establishing a mode of operation in said device, said disruption is a radiation or electrostatic discharge event, and said employing step is accomplished by electrically storing a sample of said command in a radiation hardened memory, and repetitively reading out the command sample from the memory.

* * * * *